March 27, 1928.
T. MIDGLEY
1,664,259
METHOD OF BUILDING TIRE CASINGS
Filed May 10, 1926    2 Sheets-Sheet 1
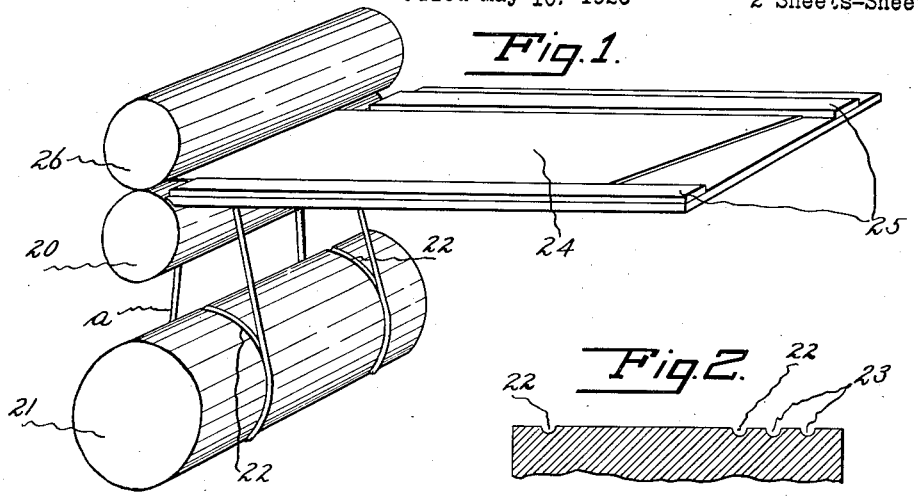
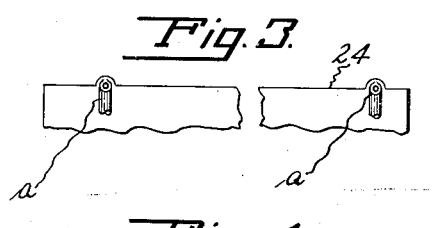
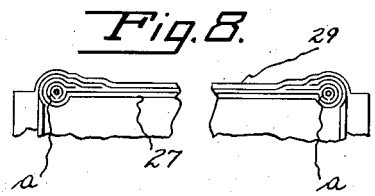
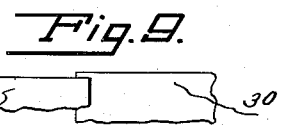
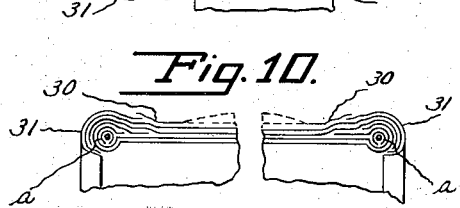
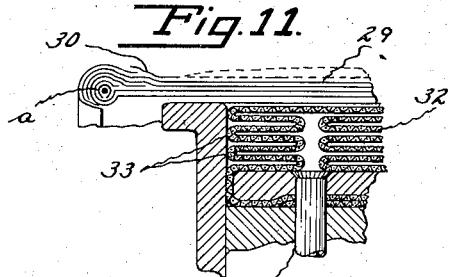
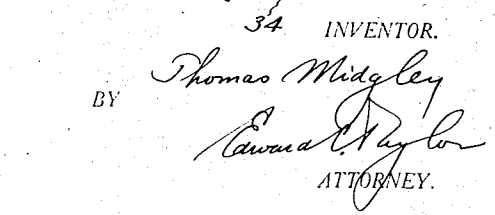
INVENTOR.
Thomas Midgley
BY
ATTORNEY.

March 27, 1928.
T. MIDGLEY
1,664,259
METHOD OF BUILDING TIRE CASINGS
Filed May 10, 1926    2 Sheets-Sheet 2
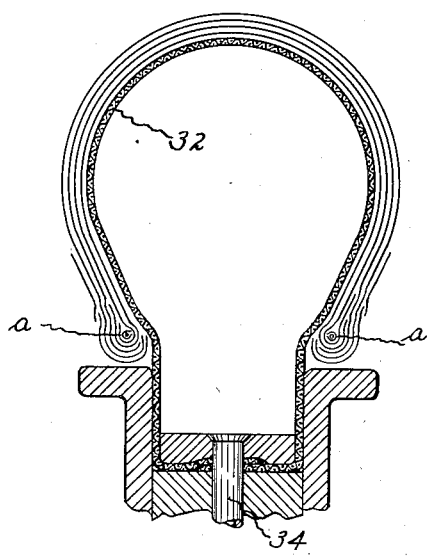
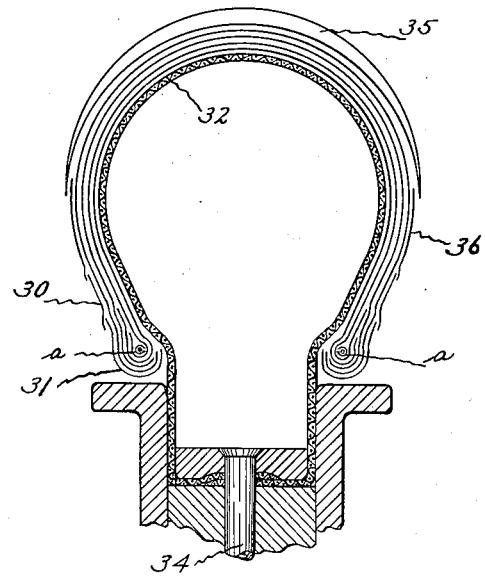
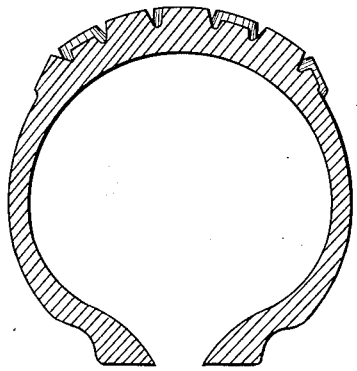
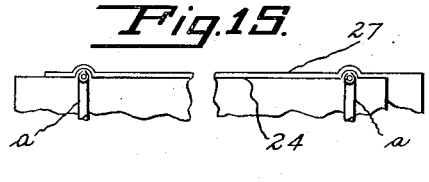
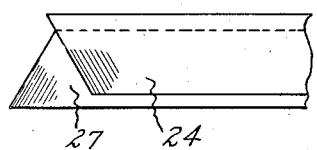
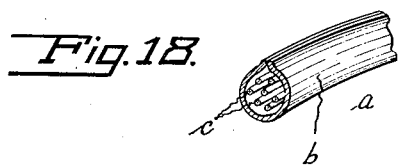
INVENTOR.
Thomas Midgley
BY
Edward C. Naylor
ATTORNEY.

Patented Mar. 27, 1928.

1,664,259

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF BUILDING TIRE CASINGS.

Application filed May 10, 1926. Serial No. 108,083.

The present invention relates to methods of building tire casings in which the carcass portion of the tire is assembled in the flat from flat pieces of tire building material. According to the present invention the tire carcass is built in substantially flat form and is then expanded into tire shape, the invention in one aspect consisting in the procedure which is followed in forming the flat band. Instead of laying the plies of rubberized cord material in order upon a forming drum, as is usually done, my improved method departs from the prior practice quite radically in this particular and in so doing attains many advantages which will appear further on in the description of the invention. It will suffice to say at this point that the plies will, according to my invention, be guided directly onto the bead anchorages and will be held permanently in place by these, instead of being first laid on a drum, the bead wires then applied, and the partially assembled carcass inverted before the application of the final plies in order to secure a more perfect attachment to the anchorages. In another aspect of my invention I improve the manner in which the bead anchorages are incorporated in the casing, to the end that the carcass plies are left free to accommodate themselves to changing positions, both in the inversion of the flat band and in its later expansion to tire form.

This application is a continuation in part of my prior application Serial No. 49,696, filed August 12th, 1925.

The invention will now be described in connection with the accompanying drawings, in which Fig. 1 is a diagrammatic perspective view showing the first ply of rubberized material being directed onto the bead wires;

Fig. 2 is a section of one of the rollers used in applying the material to the wires;

Fig. 3 is a diagrammatic view showing the application of the first ply of material to the bead wires;

Figs. 4 to 10 are similar views showing successive steps in the building of the flat band;

Figs. 11 and 12 are similar views showing the expansion of the flat band into tire form;

Fig. 13 is a similar view showing one way of applying the tread and covering rubber;

Fig. 14 is a view of the completed tire;

Fig. 15 is a view similar to Fig. 3 but showing a different method of applying the material;

Fig. 16 is a similar view at a later stage;

Fig. 17 is a detail of the material as it is supplied in the practice of the method shown in Figs. 15 and 16; and Fig. 18 is a fragmentary view of a preferred form of bead anchorage.

In the practice of the present invention the bead anchorages $a$ are first located in definite spaced relation to each other. This is conveniently done by some such arrangement as is shown in Fig. 1, in which the beads are looped around two rollers 20 and 21 having grooves 22 which serve to position the bead wires with perfect accuracy. In case tires of more than one size are to be made the rollers may be provided with extra grooves 23 as shown in Fig. 2. With the bead wires thus located and held in position the tire forming material is applied. In the case shown in Figs. 1, 3, etc., this material is in the form of single plies of cord fabric 24, cut on the bias in the way usual in the manufacture of present day cord tires. This ply of material is led to the bead wires between guides 25 which may be arranged in any suitable way. As means for pressing the material onto the bead wires there has been shown in the diagrammatic showing of the present case a roller 26, coacting with the roller 20 after the manner of wringer rolls. The result of the initial application of the first ply is indicated diagrammatically in Fig. 3. The application of the fabric to the wires has been shown in Fig. 3 and succeeding views as if the roller 26 was grooved similarly to roller 20, or was made with a flexible surface so that it will form the fabric around the wires. A roll with a smooth, relatively hard surface will cause the fabric to bridge across the wires instead of cupping around them. Either form of roll may be used with substantially uniform results.

The next operation is to turn the edges of the first ply around the bead wires as indicated by the underneath ply in Fig. 4. A second ply of material 27, preferably with the cords at an angle to the cords of the first ply, is then applied in the same manner, and the edges turned around the bead wires as is shown in Fig. 5. The folding of the first ply may be deferred until the second ply is to be folded, if desired.

After the two plies have been applied in the manner above described the compound band, comprising the spaced bead wires with the cord material bridged between them, is inverted in the manner shown in Fig. 6, bringing the folded edges of the plies on the outside. This operation is accomplished by hand with perfect ease, the band turning inside out with no difficulty.

In order that the band may be inverted without buckling or bending of the fabric around the beads it is preferable to encase the coiled bead wires c (Fig. 18) in a sheath of fabric b, rather loosely applied so as not to adhere to the wires and not vulcanized in place until the tire itself is cured. By using this form of sheath on the bead wire the fabric forming the carcass is permitted to readjust itself during the inversion of the band in a better manner than if the loose sheath were not provided. Binding of the edges of the carcass plies on the bead wires during the inversion of the band is undesirable as buckling or distortion of the strain resisting cords is likely to occur. These conditions operate directly to shorten the service life of the tire. I have found that the interposition of the loose sheath b, preferably formed of a strip of fabric folded around the wires, avoids this difficulty.

The third and fourth plies 28 and 29 are laid in place and their edges turned around the beads in the same way as the first two plies. This step is shown in Fig. 8 with the exception of the folding of the edges of the last ply. It will be seen from the above description and from the drawings that the last two plies are folded around the beads in the reverse direction from the first two plies, and that the body portion of the last plies covers the folded ends of the first plies. This feature is of considerable importance in the practice of the invention, as with the minimum of labor and with the simplest mechanism the plies can be locked in reverse directions. This cannot be accomplished with the usual methods of building flat band tires on a drum, for in the latter case plies can be tucked under the beads only with the greatest difficulty. In consequence those flat band tires which have been made with the plies folded all the way around the beads have, as far as I am aware, been made with the plies turning around the beads in the same direction instead of being reversely folded.

The covering of the tire with the tread and side wall material can be done in any desired way. I have shown the side walls 30 and the chafing strips 31 as assembled in a unit as shown in Fig. 9. The application of these strips is shown in Fig. 10, which, in the preferred way of practicing the invention, completes the building that is done while the band is in the flat form. If desired the band may again be inverted before the chafing strip is applied, so that the strip will cover the edges of the ply 29.

Expansion of the assembled band may be done by any preferred means, but I have shown for an example an apparatus which has been shown and claimed in my copending application Serial No. 49,695, filed August 12th, 1925. This apparatus consists of a fabric bag 32, formed with reverse folds 33 something on the order of what is commonly termed accordion pleating. This construction permits a large degree of expansion with practically no stretching of the material of the bag. The bag is inflated by admitting air under pressure through the pipe 34. The effect of this expansion of the bag is shown in Fig. 12, in which it will be seen that the tire has been stretched by the bag from the flat form in which it was built into the generally horseshoe form of a finished tire. The manner in which the folds of the bag straighten out also appears in this figure. During the expansion of the band into tire form the fabric sheath around the bead wires permits readjustment of the carcass plies in the same manner as in the inversion of the band, and greatly improves the strain resisting properties of that portion of the tire adjacent the beads.

The tread 35 and additional side wall material 36 are preferably added while the tire is expanded as shown in Fig. 12. Fig. 13 shows the tread and additional side wall material in place. The bag 32 may now be removed, and the tire vulcanized into the desired form as shown in Fig. 14.

Figs. 15, 16 and 17 show another way of applying the plies of material. In this case the two plies of material 24 and 27 are laminated into a strip with their cords crossing and with their ends offset as shown in Fig. 17. This strip is applied to the bead wires in the same manner as each of the single ply strips previously described, and the edges of the two plies turned under at the same time.

It will be seen from the above description that there is no possibility of inaccuracy in the spacing of the beads in this method, for the wires are at all times held at fixed distances apart. It will also be seen that the various plies are firmly locked around the beads with reverse folds in the different plies, so that the strongest possible anchorage is secured. The invention may be carried on in practice with various forms of apparatus, that shown being diagrammatic and exemplary only, and with different forms of materials, the essential features being pointed out in the following claims.

Having thus described my invention, I claim:

1. A method of building a tire carcass which comprises covering a pair of endless bead anchorages with a loose wrapping of fabric, supporting the covered anchorages in spaced relation, applying a layer of tire building material to the anchorages, inverting the band thus formed, and applying a second layer of material.

2. A method of building a tire carcass which comprises covering a pair of endless bead anchorages with a loose wrapping of fabric, supporting the covered anchorages in spaced relation, applying a layer of tire building material to the covered anchorages, folding the edge portions of the material around the anchorages, inverting the band thus formed, supplying another layer of material to the inverted band, and pressing the second layer against the body and folded edges of the first.

3. A method of building a tire carcass which comprises covering a pair of endless bead anchorages with a wrapping of fabric substantially non adherent to the wires when uncured, applying a layer of tire building material to the anchorages with the edge portions of the material secured to the fabric wrapping, and shaping the material to tire form, thereby rotating the edges of the material and the fabric wrapping around the anchorages.

4. A method of building a tire carcass which comprises applying a layer of tire building material to spaced endless bead anchorages, whereby an endless flat band is formed, inverting the band, and applying a second layer of material.

5. A method of building a tire carcass which comprises supporting a pair of endless bead anchorages in spaced relation, supplying a layer of tire building material to the anchorages, folding the edge portions of the material around the anchorages, inverting the band thus formed, supplying another layer of material to the inverted band, and pressing the second layer against the body and folded edges of the first.

THOMAS MIDGLEY.